United States Patent [19]

Cimochowski

[11] Patent Number: 4,493,176
[45] Date of Patent: Jan. 15, 1985

[54] INSULATION MODULE MOUNTING MEANS

[75] Inventor: Anthony E. Cimochowski, Sedalia, Colo.

[73] Assignee: Manville Service Corporation, Denver, Colo.

[21] Appl. No.: 266,856

[22] Filed: May 26, 1981

Related U.S. Application Data

[62] Division of Ser. No. 040,616, May 21, 1979, abandoned.

[51] Int. Cl.³ .............................................. E04B 1/80
[52] U.S. Cl. ...................................... 52/508; 52/512; 52/407
[58] Field of Search ................. 52/511, 512, 506, 510, 52/404, 407, 718, 508; 110/336, 339; 248/73, 223.4, 224.1, 224.2

[56] References Cited

U.S. PATENT DOCUMENTS

| | | | |
|---|---|---|---|
| 1,970,139 | 8/1934 | Hayden | 52/512 |
| 2,346,769 | 4/1944 | Lichtor | 52/511 |
| 2,372,772 | 4/1945 | Ellis | 411/102 |
| 2,540,790 | 2/1951 | Kost | 52/718 |
| 2,653,686 | 9/1953 | Rautt | 52/511 |
| 3,086,325 | 4/1963 | Eckel | 52/144 |
| 3,117,611 | 1/1964 | Matthews | 411/103 |
| 3,504,470 | 4/1970 | Pincemin | 52/511 |
| 3,843,475 | 10/1974 | Kent | 52/718 |
| 3,952,470 | 4/1976 | Byrd | 52/511 |
| 4,001,996 | 1/1977 | Byrd | 52/511 |
| 4,136,625 | 1/1979 | Corbet | 110/339 |

FOREIGN PATENT DOCUMENTS

| | | | |
|---|---|---|---|
| 1371274 | 7/1964 | France | 52/509 |
| 754090 | 7/1932 | Switzerland | 52/718 |

*Primary Examiner*—Henry E. Raduazo
*Attorney, Agent, or Firm*—Ronald M. Halvorsen; Cornelius P. Quinn; Timothy R. Schulte

[57] ABSTRACT

Mounting means for thermal insulation blocks or modules are described. The means comprises a rounded member adapted to fit into and cooperate with a C-shaped channel member attached to the block, with the rounded member itself being secured by a securing member to the wall of a furnace or like device. The mounting member allows the block to be easily secured to the wall even in locations of limited access.

5 Claims, 7 Drawing Figures

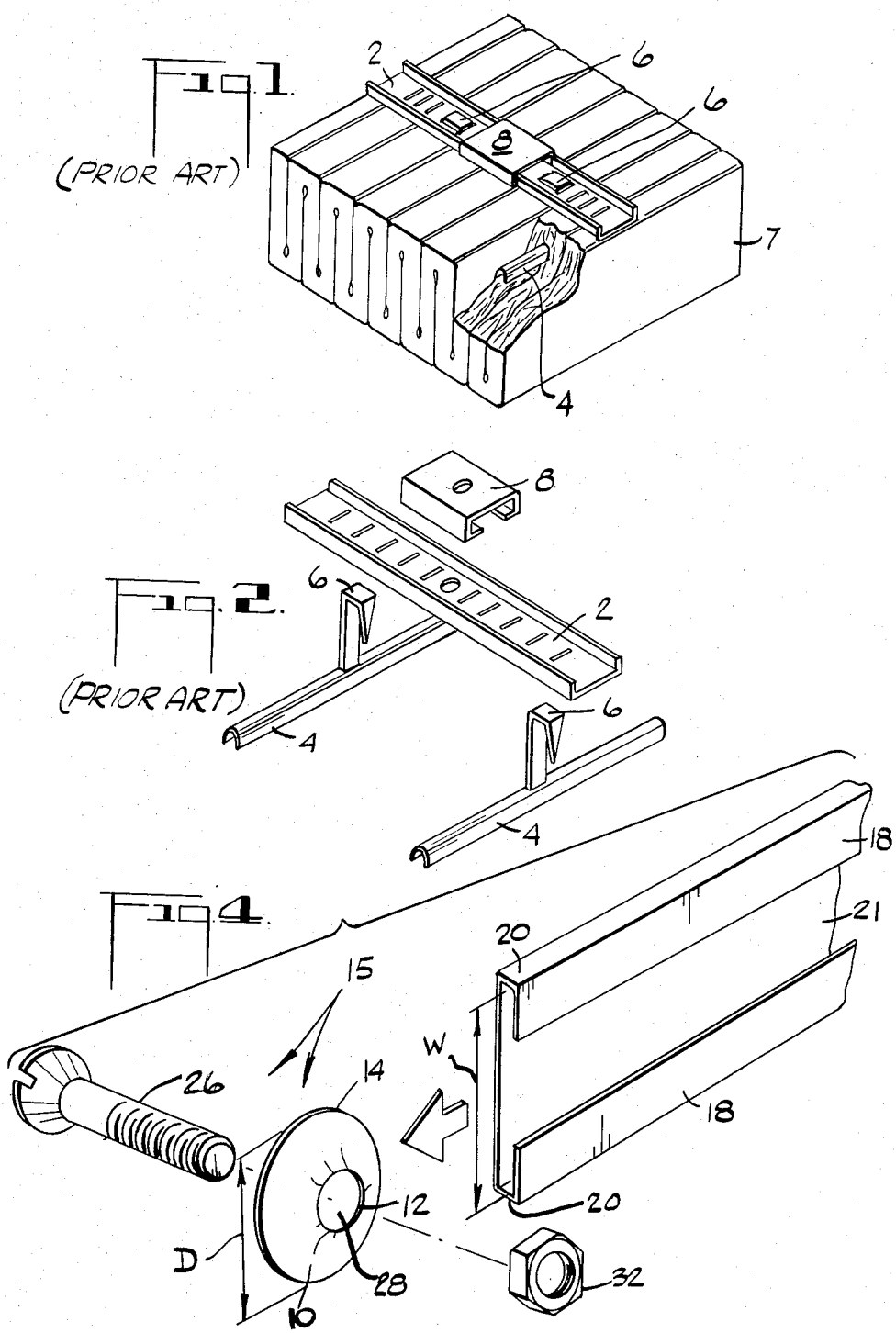

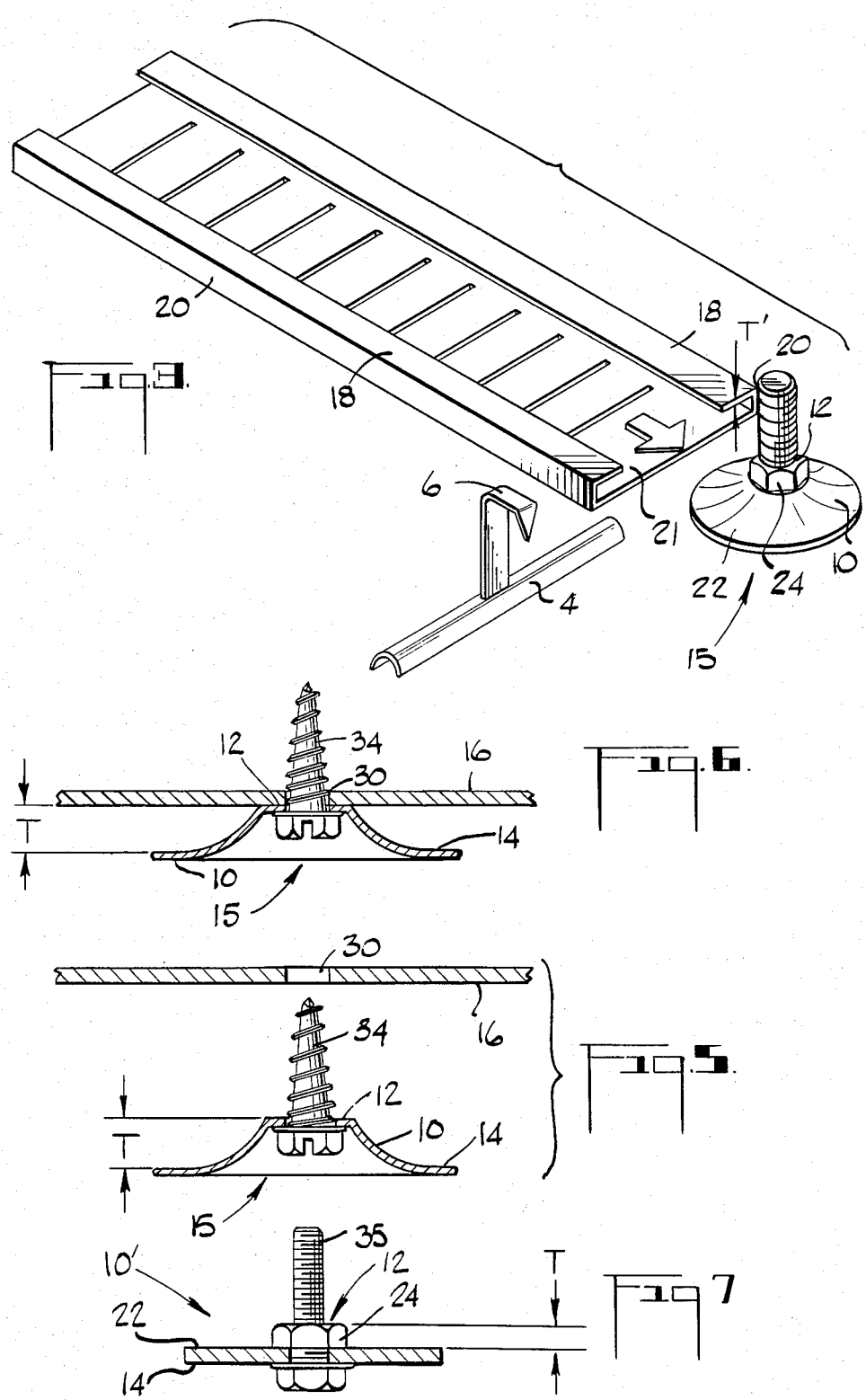

INSULATION MODULE MOUNTING MEANS

This is a division of application Ser. No. 040,616, filed May 21, 1979, and now abandoned.

TECHNICAL FIELD

The invention herein relates to thermal insulation blocks (or "modules") formed of fiber blankets. More particularly, it relates to means for mounting such blocks or modules on the interior of devices such as furnaces, ovens, kilns and the like.

BACKGROUND OF PRIOR ART

Recently thermal insulation blocks or modules formed from blankets of inorganic fibers such as refractory fibers have become widely used to form thermally insulating linings for high temperature devices such as furnaces, ovens, kilns and the like. A typical insulating block or module is illustrated in U.S. Pat. No. 4,001,996 issued to C. O. Byrd, Jr. Insulating blocks of this type have enjoyed widespread success in the marketplace as the main component of a commercial system available from Johns-Manville Corporation and its licensees under the trademark Z-BLOK.

As will be seen from FIGS. 1 and 2, the prior art insulating blocks have incorporated therein mounting brackets which normally comprise a mounting channel 2 to which are affixed a plurality of beams 4 which are embedded in the fiber body 7 and which are attached to the channel 2 by tabs 6. Normally these blocks are mounted on the wall or ceiling of a furnace or similar device by first attaching directly to the wall channel-shaped mounting clips 8 at predetermined intervals spaced according to the desired spacing of the blocks. These clips are normally alternated at 90° angles such that when the individual blocks are mounted one to a clip by sliding the channel 2 into the channel portion of the clip 8 the finished plurality of blocks has a parqueted appearance with the orientation of the folds in the blocks alternating at 90° angles. Thus, for instance, with typical blocks having dimensions of 12" in width by 12" in length by 4" to 12" in depth (30×30×10 to 30 cm) the mounting clips would be spaced on the wall or ceiling at 12" (30 cm) intervals. The parqueting arrangement allows the blocks, in which the individual folds are under compression, to bear against each other when the blocks are in place and thus minimize the shrinkage effects of the fiber at high temperature.

The system using the channel-shaped clips has proved quite successful in applications where there is ready accessibility for the workman to the furnace wall or ceiling. In these cases the workman can merely mount the clip on the wall (as by stud welding), position the end of the channel 2 aligned with the channel shape of the clip 8 and then slide the channel 2 onto the clip 8 until the block is positioned in the desired location. It has been found, however, that when access to the furnace wall or ceiling is limited it is extremely difficult for the workman to align the channel 2 with the clip 8 and to retain the two aligned until the channel 2 has been slid into the clip 8. The difficulty for the workman is increased as the job progresses because the blocks which have been mounted serve to further restrict the workman's already limited access to the wall or ceiling surface for the remaining blocks. In addition, even in locations where there is better access, the closed dimensional tolerances normally held on both the clip 8 and the channel 2 make it very difficult for the workman to align the clip and the channel and to retain that alignment without first flaring the leading edge of the clip with pliers. Of course, in cramped quarters the problem is magnified.

It would therefore be very desirable to have a mounting system which allows ready installation of the thermal insulation blocks or modules to a wall surface even when clearance and/or access are minimal.

BRIEF DESCRIPTION OF THE INVENTION

The invention herein is an article for attaching a thermal insulation block to a flat surface where the block has on one side thereof a C-shaped mounting channel, said article comprising a rounded mounting member having the center portion thereof adapted to contact the flat surface and spacing means to space the peripheral edge of the member away from the surface, with the principal dimension of the member being slightly less than the exterior width of the channel such that the channel can be mounted over the member and retained in contact therewith by cooperation between the peripheral edge and the lips of the channel, and securing means to secure the member in contact with the surface. In a preferred embodiment the rounded member is circular.

BRIEF DESCRIPTION OF THE DRAWINGS

FIGS. 1 and 2 illustrate the prior art as commercially practiced, with FIG. 1 being a perspective view partially cut-away of a thermal insulation module attached to a mounting clip and FIG. 2 being a perspective view in exploded form of the principal components of the mounting system of the prior art blocks.

FIG. 3 is a perspective view in exploded form of one embodiment of the article of the present invention.

FIG. 4 is a perspective view also in exploded form of the principal components of one embodiment of the article of the present invention.

FIG. 5 is a plan view partially in section of one embodiment of the article of the present invention positioned to be attached to a wall or similar surface.

FIG. 6 is a plan view of the embodiment of FIG. 5 as secured to the surface.

FIG. 7 is a plan view of another embodiment of the article of the present invention.

DETAILED DESCRIPTION OF THE INVENTION

The article of the present invention is designated 15 in the drawings, and comprises a rounded mounting member 10. In its preferred form the member 10 will be circular in plan, although other rounded forms such as elliptical or oval may be used as long as the length and width dimensions do not differ so much that the overall configuration approaches rectangular or square rather than being predominantly rounded. For reasons which will be discussed below, the circular form is preferred.

The article will have a "principal dimension" D which is related to the interior width W of the C-shaped mounting channel 21. The principal dimension D for the preferred circular member 10 will be the diameter. For other shapes such as oval or elliptical it will be the length of the minor axis (for an ellipse), the width of the straight portion (for an oval) or the equivalent least width (for other shapes).

The insulation block or module must have mounted on one side thereof a C-shaped mounting channel 21, formed with lips 18 and edges 20. Normally this channel 21 is mounted on the back ("cold face") of the block where it is protected from service heat.

In one embodiment the mounting member 10 (which will be referred to herein for convenience in its preferred form as "circular") is configured such that the center portion 12 projects outwardly and away from the peripheral portions 14. Thus, when the device is in place in service the center portion 12 is in direct contact with and secured to the inner surface of wall 16 of the furnace, kiln or similar device. (It will be understood that the reference to "wall" herein equally includes references to other interior surfaces of a furnace, kiln or the like such as ceilings, door panels, flat surfaced baffles and so forth, and is not intended to be limited solely to vertical surfaces.) The configuration of the circular member 10 is therefore such that the peripheral edges 14 will be spaced apart from the wall surface by a dimension designated T. The dimension T may vary according to the type of insulation block and mounting system used with the block, but in all cases the dimension T will be slightly greater than the dimension T' which is the thickness of lip 18 of the C-shaped channel member 21.

In addition, the principal dimension D of the member 10 will be slightly less than the spacing W of the two exterior walls 20 of C-shaped channel 21. Thus, when the member 10 is mounted on the wall 16 as shown in FIG. 6, the channel 21 can be readily slipped over the member 10 such that the outer edges 14 of the member 10 engage the grooves formed by the lips 18 and edges 20 of the channel 21 and thus hold the channel in position adjacent to the wall 16.

In the configuration shown in FIGS. 4, 5 and 6, the circular member 10 in cross-section has a generally gullwinged configuration with a depression in the center to receive a securing member. In another embodiment as shown in FIG. 7 the member 10 is in the form of a composite 10' composed of a flat disc 22 with attached thereto a nut 24 which can be either secured to the disc 22 itself by welding or can be threaded onto the securing means as will be described below. In this case the nut serves as the center section 12 and is the means of spacing the peripheral edges 14 away from the wall 16.

The member 10 is secured to the wall 16 by any convenient securing means. FIG. 4 illustrates an embodiment in which the member 10 is secured by means of bolt 26 which fits through central opening 28 in member 10 and then through an opening such as 30 in wall 16 (FIG. 5) and is secured thereto with nut 32. In another embodiment illustrated in FIGS. 5 and 6 the securing means is a self tapping screw 34 which penetrates through the opening 28 in member 10 and is threaded into opening 30 in wall 16. A hex head bolt 35 is used with the composite member 10' shown in FIG. 7. The nut 24 may either be threaded down onto the bolt 35 or it may be spot welded to the disc 22. If the nut 24 is spot welded, it will be convenient to have its central opening larger in diameter than the diameter of bolt 35 so that there will be no need to thread bolt 35 onto member 10' and assembly can be speeded. Alternatively, a stud may be stud welded to the wall 16 and the member 10 placed thereover and secured by a nut on the inside of the member 10 in the same position where the head of bolt 26 or 35, or screw 34 is shown in the drawings. The particular choice of the optimum securing means will depend on factors such as the material of which the furnace wall is made and the degree of accessibility available to the workman at the desired mounting point.

The significance and criticality in this invention of the circular or rounded nature of member 10 is evident. Where there is limited access the workman can mount the rounded member 10 on the furnace wall in the desired location. He can then readily slide the channel 2 over the circular member from any direction. Unlike the prior art rectangular channels 8, the tendency of the member 10 to turn on the mounting screw or bolt has little effect on the mounting of the channel 2 onto the member 10. In contrast, however, the smallest rotational motion of the clip 8 will misalign the channel 2 and clip 8 and prevent the channel 2 from being mounted on the clip 8. With limited access the workman has no way of securing the clip 8 against rotation so it usually takes him many tries and a considerable amount of luck to get the channel 2 and the clip 8 aligned and retained in alignment long enough to mount the channel 2 securely as the clip 8. With the improvement of this invention, however, the rounded member 10 can rotate freely or can be fixed in position without significantly affecting the alignment of the channel 2 and the member 10 so that despite the lack of any more than minimal access, the workman can easily align the channel 2 and the clip 10 for secure mounting.

It will also be evident from this explanation why the circular form of member 10 is preferred over elliptical, oval or other rounded forms. Each of these geometrical figures has one dimension longer than the other so that if the member 10 should by chance be aligned with the greater dimension perpendicular to the open end of the channel 2, the workman's first attempt to align the channel 2 and the member 10 will usually be unsuccessful. However, because of the rounded nature of the elliptical, oval or similar shaped member 10, the clip in most orientations other than with the greater dimension perpendicular to the channel entrance will tend to be self-aligning with the channel entrance, for the pressure of the channel entrance against a rounded portion of the member 10 will tend to cause the member 10 to align itself with the greater dimension parallel to the channel entrance and thus properly aligned for a rapid mounting of the channel 2 on the member 10. Thus, the various forms the rounded member 10 are greatly superior to the prior art rectangular or square clips 8 which have no self-aligning tendencies. It is preferred that the member 10 be circular such that total alignment is always present, since with a circular member all diameters are equal and therefore the "principal dimension" is always aligned with the channel opening.

Finally, since a rounded segment of the member 10 enters the C-shaped channel first and the remainder of the member follows, the edges 14 of the member 10 are guided into engagement with the lips 18 and edges 20 of the channel 21. Thus even despite the close dimensional tolerances maintained, engagement and interfitting of the member 10 and the channel 21 occur easily without the need to flare the edges of the member 10. Thus even where access to the wall is not restricted, the mounting system of this invention affords significant advantages over the clip system of the prior art.

STATEMENT OF INDUSTRIAL APPLICATION

The invention herein is a mounting system which is useful for the mounting of thermal insulation blocks or modules in industrial devices such as furnaces, kilns, ovens and the like, such insulation blocks serving to provide a thermally insulating lining to such industrial devices.

I claim:

1. In an apparatus for securing a fibrous insulation module to a wall of a furnace or the like, said apparatus including: a support beam mounted internally of the insulation module; a C-shaped channel member adapted to be mounted extending along one face of said insulation module, said C-shaped channel member having edges (20) extending generally parallel to one another and lips (18) extending inwardly from said edges toward one another and being generally co-planar, the distance between said edges defining a first dimension 'W' and the thickness of said lips defining a second dimension T'; tab means extending between said support means and said channel member for securing said channel member to said insulation module; a rounded mounting member having a center portion thereof in contact with said furnace wall, said mounting member having a principal dimension 'D' which is less than said first dimension 'W'; securing means for attaching said mounting member to said furnace wall; whereby said securing means may affix said mounting member to said furnace wall and thereafter said C-shaped channel may receive the principal dimension 'D' of said rounded mounting member by sliding said channel thereover from any direction, thereby securing said insulation module to said furnace wall, the improvement comprising:

a spacer attached to said center portion of said mounting member, said spacer extending from said mounting member a predetermined distance T away from said C-shaped channel member, said predetermined distance T being greater than said dimension T'.

2. Apparatus according to claim 1 wherein said mounting member is circular in plan.

3. Apparatus according to claim 1 wherein said spacing means comprises a gullwinged configuration of said mounting member.

4. Apparatus according to claim 1 wherein said mounting member comprises a round flat member with an aperture therethrough, and said spacing means comprises a smaller diametered raised member attached to said flat member and having its own aperture in alignment with the aperture of said flat member.

5. Apparatus according to claim 4 wherein said round flat member comprises a circular disc and said raised member comprises a nut welded thereto.

* * * * *